US011827995B2

United States Patent
Wang et al.

(10) Patent No.: US 11,827,995 B2
(45) Date of Patent: Nov. 28, 2023

(54) IN-SITU METHOD FOR SYNTHESIZING NI—W—WC COMPOSITE COATING

(71) Applicant: SOOCHOW UNIVERSITY, Suzhou (CN)

(72) Inventors: Huihua Wang, Suzhou (CN); Yingjun Xu, Suzhou (CN); Shizhan Sheng, Suzhou (CN); Deyong Wang, Suzhou (CN); Tianpeng Qu, Suzhou (CN); Jun Tian, Suzhou (CN); Dong Hou, Suzhou (CN); Xianglong Li, Suzhou (CN); Shaoyan Hu, Suzhou (CN)

(73) Assignee: SOOCHOW UNIVERSITY, Suzhou (CN)

( * ) Notice: Subject to any disclaimer, the term of this patent is extended or adjusted under 35 U.S.C. 154(b) by 0 days.

(21) Appl. No.: 17/802,938

(22) PCT Filed: Aug. 23, 2021

(86) PCT No.: PCT/CN2021/113976
§ 371 (c)(1),
(2) Date: Aug. 26, 2022

(87) PCT Pub. No.: WO2023/015602
PCT Pub. Date: Feb. 16, 2023

(65) Prior Publication Data
US 2023/0279573 A1 Sep. 7, 2023

(30) Foreign Application Priority Data

Aug. 13, 2021 (CN) .......................... 202110929904.2

(51) Int. Cl.
| | | |
|---|---|---|
| C25D 3/12 | (2006.01) | |
| C25D 3/56 | (2006.01) | |
| C25D 5/50 | (2006.01) | |
| C25D 7/06 | (2006.01) | |
| C25D 17/10 | (2006.01) | |

(52) U.S. Cl.
CPC ................ C25D 3/12 (2013.01); C25D 3/56 (2013.01); C25D 5/50 (2013.01); C25D 7/0614 (2013.01); C25D 17/10 (2013.01)

(58) Field of Classification Search
None
See application file for complete search history.

(56) References Cited

U.S. PATENT DOCUMENTS

| 4,892,627 A | 1/1990 | Takada |
|---|---|---|
| 6,699,379 B1 | 3/2004 | Ke et al. |

FOREIGN PATENT DOCUMENTS

| CN | 1074493 A | | 7/1993 |
|---|---|---|---|
| CN | 105714136 A | * | 6/2016 |
| CN | 112030213 A | | 12/2020 |
| CN | 112111765 A | | 12/2020 |
| JP | 2006104574 A | | 4/2006 |

OTHER PUBLICATIONS

Boonyongmaneerat et al. (Surface & Coatings Technology 203 '2009' 3590-3594) (Year: 2009).*
Machine translation of Liu et al. CN 105714136 A (Year: 2016).*

* cited by examiner

*Primary Examiner* — Wojciech Haske
(74) *Attorney, Agent, or Firm* — SZDC LAW P.C.

(57) ABSTRACT

The present invention provides an in-situ method for synthesizing a Ni—W—WC composite coating, which includes the following steps: immersing a carbon steel substrate to be coated in an electroplating solution and electroplating, to obtain a Ni—W—C alloy coating on the surface of the carbon steel substrate; and then subjecting the alloy coating to high temperature heat treatment to obtain the Ni—W—WC composite coating. The electroplating solution comprises the following components: a nickel salt, a tungstate, citric acid, a citrate, a recarburizer, and a wetting agent. The present invention shows merits of simple operation, high current efficiency, simple electroplating process, and is clean and causes no pollution, thus meeting the requirements of environment protection.

10 Claims, 5 Drawing Sheets

IN-SITU METHOD FOR SYNTHESIZING NI—W—WC COMPOSITE COATING

This application is the National Stage Application of PCT/CN2021/113976, filed on Aug. 23, 2021, which claims priority to Chinese Patent Application No. 202110929904.2, filed on Aug. 13, 2021, which is incorporated by reference for all purposes as if fully set forth herein.

FIELD OF THE INVENTION

The present invention relates to the technical field of metal surface engineering, and in particular to an in-situ method for synthesizing a Ni—W—WC composite coating.

DESCRIPTION OF THE RELATED ART

With the rapid development of surface engineering and technology, coatings with special functions have received more and more attention. Hard chromium coating has the characteristics of high hardness and high corrosion resistance, and is thus widely used in the field of surface engineering. However, the chromium-containing plating solution is very harmful, and there are defects such as high power consumption during electroplating and low current efficiency, gradually causing the elimination of the technology. Instead, "environmentally friendly and economic" chromium-alternative coating is developed. Ni—W alloy coatings integrate the advantages of nickel and tungsten metals, and have a corrosion resistance and a wear resistance that are significantly better than those of other nickel-based metal alloys, thus being useful as surface coating materials for workpieces such as bearings, pistons, cylinders and oil pipelines. Moreover, Ni—W alloy coatings have good corrosion resistance, for example, the color of a neutral salt mist remains unchanged over 120 h. The hardness is 600 Hv, and can reach 1000 Hv after heat treatment at 400° C. for 2 h, which is higher than the hard chromium coating. Therefore, it has become an important chromium-alternative coating. However, for Ni—W alloys, when the tungsten content in the alloy reaches 20% or more, the brittleness of the coating increases significantly, and the interfacial bonding force deteriorates sharply. Although the brittleness is decreased somewhat after heat treatment, the interfacial bonding force cannot be fundamentally improved, and the coating will peel off in a serious case. Therefore, decreasing the internal stress and improving the interfacial bonding force of high tungsten Ni—W alloy coatings have become the focus of attention in the current chromium-alternative process.

To further increase the hardness and wear resistance of Ni—W alloy coating, a composite plating technology is usually used. That is, a certain amount of micron-scale or nano-scale hard particles is added to the electroplating solution during the electroplating process, and these hard particles are dispersed in the Ni—W alloy coating to form a composite coating. At present, the hard particles used in the Ni—W composite coating include $TiO_2$, $ZrO_2$, diamond, SiC, WC, $Al_2O_3$, and so on. WC has a high hardness, excellent wear resistance, and high chemical stability, and thus becomes the most commonly used coating reinforcement particles. Studies have shown that WC can be well wetted by Co, Ni, and Fe, and thus the preparation of Ni—W composite coating with WC as reinforcing particles can improve the hardness and high temperature stability of the coating. Chinese Patent No. CN101122043 discloses a method for preparing a nano-tungsten carbide-nickel composite coating for hydraulic machinery, where a nano-tungsten carbide powder is added to an electroplating solution, and the formed coating can be used as an anti-corrosion and anti-wear component material in hydraulic machinery. This method has the characteristics of high powder utilization, and low production cost. However, WC particles tend to agglomerate in the electroplating solution, and impurities may be entrapped. Therefore, when WC particles are directly used as reinforcing particles to be incorporated into the coating, defects such as large porosities and coarse structures generally occur. As described in the "Effects of WC addition on structure and hardness of electrodeposited Ni—W" (doi.org/10.1016/j.surfcoat.2009.05.027), a Ni—W/WC composite coating is prepared by adding WC particles, and the results show that process parameters, including the current density, particle content and particle size, affect the surface morphology of the coating and thus the apparent hardness. All the results show the method of obtaining a composite coating by adding WC particles into the plating bath has the disadvantages of narrow process scope, and low doping content of WC in the coating. Therefore, it is of great significance to develop a new method to preparing a Ni—W—WC composite coating.

SUMMARY OF THE INVENTION

To overcome the above technical problems, the present invention provides an in-situ method for synthesizing a Ni—W—WC composite coating. The present invention has simple operation, high current efficiency, simple electroplating process, and is clean and environmentally friendly, thus meeting the requirement of environment protection.

An in-situ method for synthesizing a Ni—W—WC composite coating comprises the following steps: immersing a substrate to be coated in an electroplating solution and electroplating, to obtain a Ni—W—C alloy coating on the surface of a carbon steel substrate; and then subjecting the alloy coating to high-temperature heat treatment to obtain the Ni—W—WC composite coating. The electroplating solution comprises the following components: a nickel salt, a tungstate, citric acid, a citrate, a recarburizer, and a wetting agent. The substrate is a carbon steel substrate.

In an embodiment of the present invention, the nickel salt is selected from the group consisting of nickel sulfate, nickel sulfonate, nickel chloride and any combination thereof.

In an embodiment of the present invention, the tungstate is sodium tungstate.

In an embodiment of the present invention, the recarburizer is selected from the group consisting of 2-(4-pyridyl) ethanesulfonic acid, 2-pyridinesulfonic acid, 3-pyridinesulfonic acid, pyridinium propanesulfonate and any combination thereof.

In an embodiment of the present invention, the wetting agent is selected from of XP-70, XP-80, XP-90, X-100, X-114 and any combination thereof.

In an embodiment of the present invention, the concentration range of each component in the electroplating solution is: nickel salt 20-70 g/L, tungstate 30-85 g/L, citric acid 7-35 g/L, citrate 10-70 g/L, recarburizer 1-14 g/L, and wetting agent 0.5-9.5 mL/L.

In an embodiment of the present invention, the electroplating solution is prepared through a process including: mixing the nickel salt, the tungstate, citric acid, the citrate into water to form a uniform solution; adding the recarburizer, and the wetting agent to the above solution; and then adjusting the solution with a pH of 7.5-7.8, to obtain the electroplating solution.

In an embodiment of the present invention, during the electroplating process, the anode material is an iridium-tantalum alloy, and the cathode is a carbon steel substrate.

In an embodiment of the present invention, during the electroplating process, the cathode current density is 2-5 A/dm$^2$.

In an embodiment of the present invention, the Ni—W—C alloy coatings comprise C with a mass of 7-12 wt. % and W of 35-45 wt. %.

In an embodiment of the present invention, the heat treatment temperature of the Ni—W—WC composite coating is 700-1000° C., and the time is 2 h.

In an embodiment of the present invention, the Ni—W—WC composite coating has a thickness of 10-20 μm.

Compared with the prior art, the technical solution of the present invention has the following advantages:

In the electroplating solution of the present invention, a citrate, and a recarburizer are used as a carbon source; and by adjusting the process parameters, the intermediate products decomposed from the citrate and the recarburizer are promoted to be adsorbed on the surface of the coating as much as possible, and are entrapped in the coating during the electrodeposition process, to obtain a Ni—W—C alloy coating.

A high-tungsten Ni—W—C alloy coating with the W content up to 35-45 wt %, and the C content of 7-12 wt % is prepared by adding a recarburizer to the electroplating solution. Notably, C entrapped in the coating can significantly reduce the internal stress of the Ni—W coating, and is mostly gathered near the grain boundaries due to the low solubility in the Ni—W alloy coating. The tungsten atom has a strong tendency to migrate to the grain boundaries or phase boundaries because of its larger atomic radius in the Ni—W solid solution. At a certain temperature, when the segregated tungsten atoms reach a certain concentration, they will react with the carbon atoms located at the grain boundaries, to form nano-scale WC particles in situ. These particles are dispersed in the coating, which enhance the wear resistance, the corrosion resistance and high-temperature thermal stability of the coating.

The Ni—W—WC composite coating prepared in the present invention is of a nanocrystalline structure or an amorphous structure, having flat surface, fine crystal, uniform composition, small grains, less defects, high hardness (1500-2000 Hv), high corrosion resistance, self-lubrication performance, and strong interfacial bonding force and so on.

The WC particles obtained in the present invention are synthesized in situ, through which the tendency to agglomeration of the added WC particles, the poor interfacial wettability and unfavorable factors such as limitations on the amount and size in the traditional composite plating process are all avoided. Moreover, the Ni—W—C alloy coating entrapped with C has a significantly smaller macroscopic stress than the traditional Ni—W alloy coating, especially for Ni—W alloy coatings with a high tungsten content. These factors promote the better mechanical properties of the in-situ synthesized Ni—W—WC composite coating.

BRIEF DESCRIPTION OF THE DRAWINGS

To make the disclosure of the present invention more comprehensible, the present invention will be further described in detail by way of specific embodiments of the present invention with reference the accompanying drawings, in which.

DETAILED DESCRIPTION OF THE PREFERRED EMBODIMENTS

Figure 1:
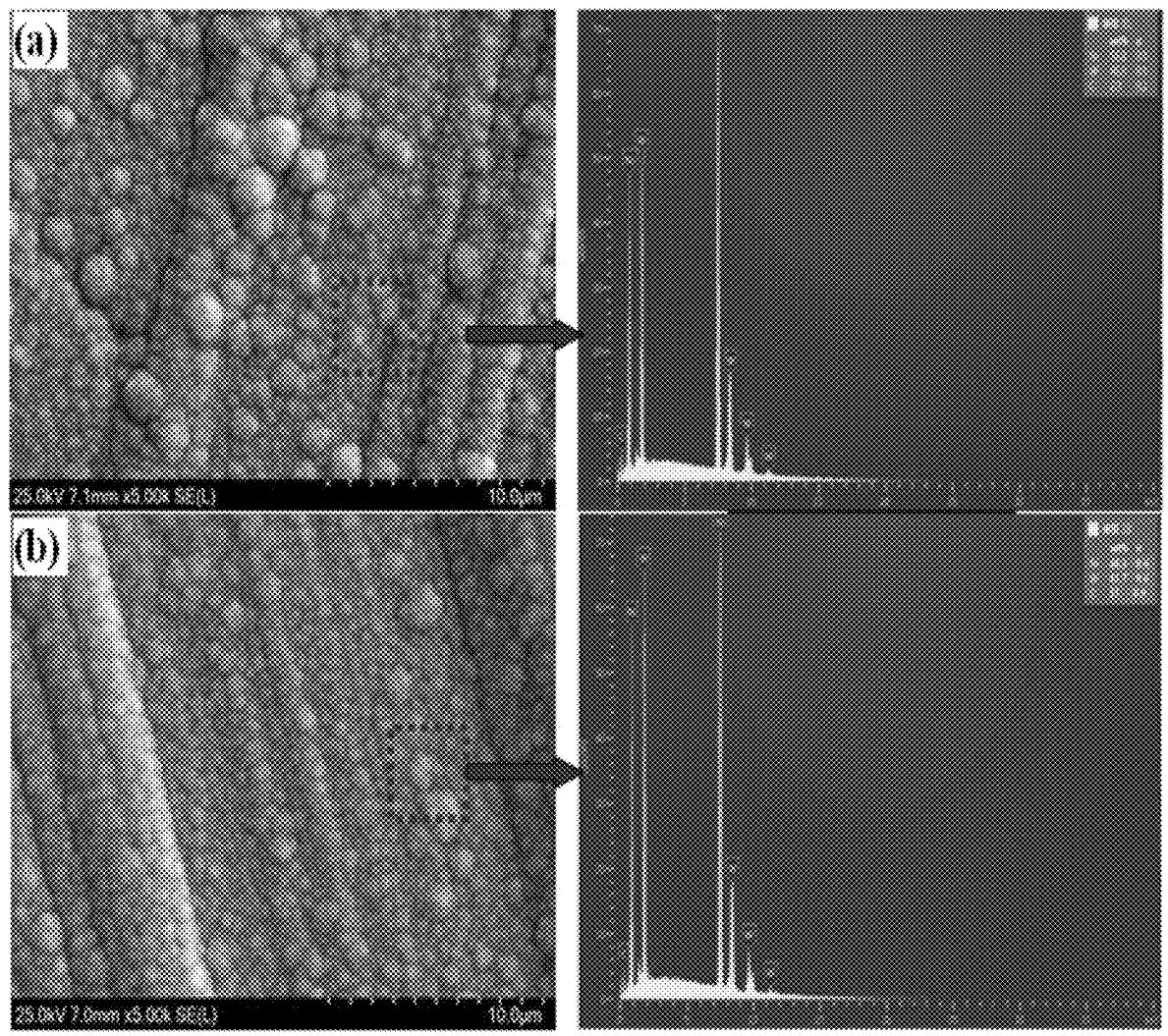
FIG. 1 shows the morphology and element composition of a coating obtained in Example 2 and in Comparative Example 2 of the present invention, in which (a) shows a coating obtained in an electroplating solution containing no recarburizer, and (b) shows a coating obtained in an electroplating solution containing a recarburizer.

The present invention will be further described below with reference to the accompanying drawings and specific examples, so that those skilled in the art can better understand and implement the present invention; however, the present invention is not limited thereto.

Example 1

An in-situ method for synthesizing a Ni—W—WC composite coating is provided. The process was specifically as follows.

(1) Preparation of electroplating solution: 300 mL of deionized water was added to a cleaned 1 #beaker, and heated to 65° C.; and then an amount of solid nickel sulfate was added, and stirred until it was completely dissolved. Another 300 mL of deionized water was heated to 75° C. in a 2 #beaker, and then sodium citrate, citric acid, ammonium citrate and sodium tungstate were added sequentially, and stirred until they were completely dissolved. The liquid in the 1 #beaker was slowly added to the 2 #beaker; and then a recarburizer and a wetting agent were added, and stirred until they were completely dissolved. Finally, deionized water was added to make up the solution in the 2 #beaker to a constant volume, and the solution was adjusted to a pH of 7.5 with aqueous ammonia. The composition of the electroplating solution is shown in Table 1:

TABLE 1

Composition of electroplating solution in Example 1

| Ingredient | Concentration |
| --- | --- |
| NiSO$_4$•6H$_2$O | 20 g/L |
| Na$_2$WO$_4$•2H$_2$O | 30 g/L |
| Na$_3$C$_6$H$_5$O$_7$•2H$_2$O | 10 g/L |
| C$_6$H$_8$O$_7$ | 7 g/L |
| C$_6$H$_{17}$N$_3$O$_7$ | 1 g/L |
| 2-(4-pyridyl)ethanesulfonic acid | 1 g/L |
| XP-80 | 0.5 mL/L |

(2) Pretreatment of carbon steel substrate: The surface (10×10 cm$^2$) of a carbon steel substrate was polished with 180 #-240 #carborundum, washed with deionized water, degreased with 350 mL of a degreasing reagent (a mixed solution containing hydrogen sodium oxide of 8 g/L, sodium silicate of 2 g/L, sodium carbonate of 1.5 g/L, and sodium citrate of 0.5 g/L) at 65° C., and washed with water, then with 10% H$_2$SO$_4$ for 10 min, and then with water until neutral.

(3) Low-current electrolysis: An appropriate amount of electroplating solution with composition shown in Table 1 was added to an electroplating bath. Low-current electrolysis was carried out using a constant voltage DC power supply with a corrugated iron plate as the cathode and stainless steel as the anode to allow the complexing agent and additives in the freshly prepared electroplating solution to reach an optimum state. During electrolysis, the temperature was controlled at 65° C., the cathode current density was 1 A/dm$^2$, and the time was 10 h. (the freshly prepared electroplating solution was pretreated by low-current electrolysis, during which the complexing agent and additives could reach an optimum state).

(4) Preparation of Ni—W—C alloy coating by electrodeposition: The substrate obtained in step (2) was electroplated in the electroplating solution treated in step (3). The specific electroplating conditions were: an anode of an iridium-tantalum alloy, a cathode of a pretreated carbon steel substrate, an electroplating solution temperature of 65° C., a cathode current density of 2 A/dm$^2$, and an electroplating time of 60 min. A coating with a thickness of 10 μm was obtained, where the weight ratio of each element in the coating was about Ni:W:C=50:40:10.

(5) In-situ synthesis of Ni—W—WC composite coating: The coating obtained in step (4) was heated to 700° C. at a ramping rate of 5° C./min and held for 3 h under an argon atmosphere, cooled down to about 200° C. with the furnace, removed from the furnace and air cooled.

Example 2

An in-situ method for synthesizing a Ni—W—WC composite coating is provided. The process was specifically as follows.

(1) Preparation of electroplating solution: 300 mL of deionized water was added to a cleaned 1 #beaker, and heated to 65° C.; and then an amount of solid nickel sulfate was added, and stirred until they were completely dissolved. Another 300 mL of deionized water was heated to 75° C. in a 2 #beaker, and then sodium citrate, citric acid, ammonium citrate and sodium tungstate were added sequentially, and stirred until they were completely dissolved. The liquid in the 1 #beaker was slowly added to the 2 #beaker; and then a recarburizer and a wetting agent were added, and stirred until they were completely dissolved. Finally, deionized water was added to make up the solution in the 2 #beaker to a constant volume, and the solution was adjusted to pH 7.6 with aqueous ammonia. The composition of the electroplating solution is shown in Table 2:

TABLE 2

Composition of electroplating solution in Example 2

| Ingredient | Content |
| --- | --- |
| NiSO$_4$•6H$_2$O | 40 g/L |
| Na$_2$WO$_4$•2H$_2$O | 50 g/L |
| Na$_3$C$_6$H$_5$O$_7$•2H$_2$O | 45 g/L |
| C$_6$H$_8$O$_7$ | 20 g/L |
| C$_6$H$_{17}$N$_3$O$_7$ | 5 g/L |
| 3-pyridinesulfonic acid | 6 g/L |
| X-114 | 6 mL/L |

(2) Pretreatment of substrate: The surface (10×10 cm$^2$) of a carbon steel substrate was polished with 180 #-240 #carborundum, washed with deionized water, degreased with 350 mL of a degreasing reagent (a mixed solution containing hydrogen sodium oxide of 8 g/L, sodium silicate of 2 g/L, sodium carbonate of 1.5 g/L, and sodium citrate of 0.5 g/L) at 65° C., and washed with water, then with 10% H$_2$SO$_4$ for 10 min, and finally with water until neutral.

(3) Low-current electrolysis: An appropriate amount of electroplating solution having a composition as shown in Table 2 was added to an electroplating bath. Low-current electrolysis was carried out using a constant voltage DC power supply with a corrugated iron plate as the cathode and stainless steel as the anode. to allow the complexing agent and additives in the freshly prepared electroplating solution to reach an optimum state. During electrolysis, the temperature was controlled at 67° C., the cathode current density was 1 A/dm$^2$, and the electrolytic treatment was continued for 12 h.

(4) Preparation of Ni—W—C alloy coating by electrodeposition: The substrate obtained in step (2) was electroplated in the electroplating solution treated in step (3). The specific electroplating conditions were: an anode of an iridium-tantalum alloy, a cathode of a pretreated carbon steel substrate, an electroplating solution temperature of 67° C., a cathode current density of 3 A/dm$^2$, and an electroplating time of 50 min. A coating with a thickness of 15 μm was obtained, where the weight ratio of each element in the coating was about Ni:W:C=46.3:41.7:12.

(5) In-situ synthesis of Ni—W—WC composite coating: The coating obtained in step (4) was heated to 800° C. at a ramping rate of 5° C./min and held for 2 h under an argon atmosphere, cooled down to about 200° C. with the furnace, removed from the furnace and air cooled.

Example 3

An in-situ method for synthesizing a Ni—W—WC composite coating is provided. The process was specifically as follows.

(1) Preparation of electroplating solution: 300 mL of deionized water was added to a cleaned 1 #beaker, and heated to 65° C.; and then an amount of solid nickel sulfate was added, and stirred until they were completely dissolved. Another 300 mL of deionized water was heated to 75° C. in a 2 #beaker, and then sodium citrate, citric acid, ammonium citrate and sodium tungstate were added sequentially, and stirred until they were completely dissolved. The liquid in the 1 #beaker was slowly added to the 2 #beaker; and then a recarburizer and a wetting agent were added, and stirred until they were completely dissolved. Finally, deionized water was added to make up the solution in the 2 #beaker to a constant volume, and the solution was adjusted to pH 7.7 with aqueous ammonia. The composition of the electroplating solution is shown in Table 3:

TABLE 3

Composition of electroplating solution in Example 3

| Ingredient | Content |
| --- | --- |
| NiSO$_4$•6H$_2$O | 50 g/L |
| Na$_2$WO$_4$•2H$_2$O | 65 g/L |
| Na$_3$C$_6$H$_5$O$_7$•2H$_2$O | 60 g/L |
| C$_6$H$_8$O$_7$ | 20 g/L |
| C$_6$H$_{17}$N$_3$O$_7$ | 9 g/L |
| 2-pyridinesulfonic acid | 9 g/L |
| XP-90 | 8 mL/L |

(2) Pretreatment of carbon steel substrate: The surface (10×10 cm$^2$) of a carbon steel substrate was polished with 180 #-240 #carborundum, washed with deionized water, degreased with 350 mL of a degreasing reagent (a mixed solution containing hydrogen sodium oxide of 8 g/L, sodium silicate of 2 g/L, sodium carbonate of 1.5 g/L, and sodium citrate of 0.5 g/L) at 65° C., and washed with water, then with 10% $H_2SO_4$ for 10 min, and then with water until neutral.

(3) Low-current electrolysis: An appropriate amount of an electroplating solution having a composition as shown in Table 3 was added to an electroplating bath. Low-current electrolysis was carried out using a constant voltage DC power supply with a corrugated iron plate as the cathode and stainless steel as the anode. to allow the complexing agent and additives in the freshly prepared electroplating solution to reach an optimum state. During electrolysis, the temperature was controlled at 68° C., the cathode current density was 1 A/dm², and the electrolytic treatment was continued for 10 h.

(4) Preparation of Ni—W—C alloy coating by electrodeposition: The substrate obtained in step (2) was electroplated in the electroplating solution treated in step (3). The specific electroplating conditions were: an anode of an iridium-tantalum alloy, a cathode of a pretreated carbon steel substrate, an electroplating solution temperature of 68° C., a cathode current density of 4 A/dm², and an electroplating time of 45 min. A coating with a thickness of 17 μm was obtained, where the weight ratio of each element in the coating was about Ni:W:C=48.4:42.4:9.2.

(5) In-situ synthesis of Ni—W—WC composite coating: The coating obtained in step (4) was heated to 900° C. at a ramping rate of 5° C./min and held for 2 h under an argon atmosphere, cooled down to about 200° C. with the furnace, removed from the furnace and air cooled.

Example 4

An in-situ method for synthesizing a Ni—W—WC composite coating is provided. The process was specifically as follows.

(1) Preparation of electroplating solution: 300 mL of deionized water was added to a cleaned 1 #beaker, and heated to 65° C.; and then an amount of solid nickel sulfate was added, and stirred until they were completely dissolved. Another 300 mL of deionized water was heated to 75° C. in a 2 #beaker, and then sodium citrate, citric acid, ammonium citrate and sodium tungstate were added sequentially, and stirred until they were completely dissolved. The liquid in the 1 #beaker was slowly added to the 2 #beaker; and then a recarburizer and a wetting agent were added, and stirred until they were completely dissolved. Finally, deionized water was added to make up the solution in the 2 #beaker to a constant volume, and the solution was adjusted to pH 7.8 with aqueous ammonia. The composition of the electroplating solution is shown in Table 4:

TABLE 4

Composition of electroplating solution in Example 4

| Ingredient | Content |
|---|---|
| $NiSO_4 \cdot 6H_2O$ | 70 g/L |
| $Na_2WO_4 \cdot 2H_2O$ | 85 g/L |
| $Na_3C_6H_5O_7 \cdot 2H_2O$ | 70 g/L |
| $C_6H_8O_7$ | 35 g/L |
| $C_6H_{17}N_3O_7$ | 13 g/L |
| Pyridinium propanesulfonate | 14 g/L |
| XP-70 | 9.5 mL/L |

(2) Pretreatment of carbon steel substrate: The surface (10×10 cm²) of a carbon steel substrate was polished with 180 #-240 #carborundum, washed with deionized water, degreased with 350 mL of a degreasing reagent (a mixed solution containing hydrogen sodium oxide of 8 g/L, sodium silicate of 2 g/L, sodium carbonate of 1.5 g/L, and sodium citrate of 0.5 g/L) at 65° C., and washed with water, then with 10% $H_2SO_4$ for 10 min, and then with water until neutral.

(3) Low-current electrolysis: An appropriate amount of an electroplating solution having a composition as shown in Table 4 was added to an electroplating bath. Low-current electrolysis was carried out using a constant voltage DC power supply with a corrugated iron plate as the cathode and stainless steel as the anode. to allow the complexing agent and additives in the freshly prepared electroplating solution to reach an optimum state. During electrolysis, the temperature was controlled at 70° C., the cathode current density was 1.2 A/dm², and the electrolytic treatment was continued for 12 h.

(4) Preparation of Ni—W—C alloy coating by electrodeposition: The substrate obtained in step (2) was electroplated in the electroplating solution treated in step (3). The specific electroplating conditions were: an anode of a carbon steel anode material, an electroplating solution temperature of 70° C., a cathode current density of 5 A/dm², and an electroplating time of 40 min. A coating with a thickness of 20 μm was obtained, where the weight ratio of each element in the coating was about Ni:W:C=44.5:45:10.5.

(5) In-situ synthesis of Ni—W—WC composite coating: The coating obtained in step (4) was heated to 900° C. at a ramping rate of 5° C./min and held for 2 h under an argon atmosphere, cooled down to about 200° C. with the furnace, removed from the furnace and air cooled.

Comparative Example 1 without Recarburizer

An in-situ method for synthesizing a Ni—W—WC composite coating is provided. The process was specifically as follows.

(1) Preparation of electroplating solution: 300 mL of deionized water was added to a cleaned 1 #beaker, and heated to 65° C.; and then an amount of solid nickel sulfate was added, and stirred until they were completely dissolved. Another 300 mL of deionized water was heated to 75° C. in a 2 #beaker, and then sodium citrate, citric acid, ammonium citrate and sodium tungstate were added sequentially, and stirred until they were completely dissolved. The liquid in the 1 #beaker was slowly added to the 2 #beaker; and then a wetting agent were added, and stirred until it was completely dissolved. Finally, deionized water was added to make up the solution in the 2 #beaker to a constant volume, and the solution was adjusted to pH 7.6 with aqueous ammonia. The composition of the electroplating solution is shown in Table 5:

TABLE 5

Composition of electroplating solution in Comparative Example 1

| Ingredient | Content |
|---|---|
| $NiSO_4 \cdot 6H_2O$ | 40 g/L |
| $Na_2WO_4 \cdot 2H_2O$ | 50 g/L |
| $Na_3C_6H_5O_7 \cdot 2H_2O$ | 45 g/L |
| $C_6H_8O_7$ | 20 g/L |
| $C_6H_{17}N_3O_7$ | 5 g/L |
| X-114 | 6 mL/L |

(2) Pretreatment of substrate: The surface (10×10 cm²) of a carbon steel substrate was polished with 180 #-240 #carborundum, washed with deionized water, degreased with 350 mL of a degreasing reagent (a mixed solution containing hydrogen sodium oxide of 8 g/L, sodium silicate of 2 g/L, sodium carbonate of 1.5 g/L, and sodium citrate of 0.5 g/L) at 65° C., and washed with water, then with 10% $H_2SO_4$ for 10 min, and then with water until neutral.

(3) Low-current electrolysis: An appropriate amount of an electroplating solution having a composition as shown in Table 5 was added to an electroplating bath. Low-current electrolysis was carried out using a constant voltage DC power supply with a corrugated iron plate as the cathode and stainless steel as the anode. to allow the complexing agent and additives in the freshly prepared electroplating solution to reach an optimum state. During electrolysis, the temperature was controlled at 67° C., the current density in the cathode was 1 A/dm$^2$, and the electrolytic treatment was continued for 12 h.

(4) Preparation of Ni—W—C alloy coating by electrodeposition: The substrate obtained in step (2) was electroplated in the electroplating solution treated in step (3). The specific electroplating conditions were: an anode of an iridium-tantalum alloy, a cathode of a pretreated carbon steel substrate, an electroplating solution temperature of 67° C., a cathode current density of 3 A/dm$^2$, and an electroplating time of 50 min. A coating with a thickness of 15 μm was obtained, where the weight ratio of each element in the coating was about Ni:W:C=56.8:40.5:2.7.

(5) In-situ synthesis of Ni—W—WC composite coating: The coating obtained in step (4) was heated to 800° C. at a ramping rate of 5° C./min and held for 2 h under an argon atmosphere, cooled down to about 200° C. with the furnace, removed from the furnace and air cooled.

Comparative Example 2 Electroplating at Low Current Density

An in-situ method for synthesizing a Ni—W—WC composite coating is provided. The process was specifically as follows.

(1) Preparation of electroplating solution: 300 mL of deionized water was added to a cleaned 1 #beaker, and heated to 65° C.; and then an amount of solid nickel sulfate was added, and stirred until they were completely dissolved. Another 300 mL of deionized water was heated to 75° C. in a 2 #beaker, and then sodium citrate, citric acid, ammonium citrate and sodium tungstate were added sequentially, and stirred until they were completely dissolved. The liquid in the 1 #beaker was slowly added to the 2 #beaker; and then a recarburizer and a wetting agent were added, and stirred until they were completely dissolved. Finally, deionized water was added to make up the solution in the 2 #beaker to a constant volume, and the solution was adjusted to pH 7.6 with aqueous ammonia. The composition of the electroplating solution is shown in Table 2.

(2) Pretreatment of substrate: The surface (10×10 cm$^2$) of a carbon steel substrate was polished with 180 #-240 #carborundum, washed with deionized water, degreased with 350 mL of a degreasing reagent (a mixed solution containing hydrogen sodium oxide of 8 g/L, sodium silicate of 2 g/L, sodium carbonate of 1.5 g/L, and sodium citrate of 0.5 g/L) at 65° C., and washed with water, then with 10% $H_2SO_4$ for 10 min, and then with water until neutral.

(3) Low-current electrolysis: An appropriate amount of an electroplating solution having a composition as shown in Table 2 was added to an electroplating bath. Low-current electrolysis was carried out using a constant voltage DC power supply with a corrugated iron plate as the cathode and stainless steel as the anode. to allow the complexing agent and additives in the freshly prepared electroplating solution to reach an optimum state. During electrolysis, the temperature was controlled at 67° C., the cathode current density was 1 A/dm$^2$, and the electrolytic treatment was continued for 12 h.

(4) Preparation of Ni—W—C alloy coating by electrodeposition: The substrate obtained in step (2) was electroplated in the electroplating solution treated in step (3). The specific electroplating conditions were: an anode of an iridium-tantalum alloy, a cathode of a pretreated carbon steel substrate, an electroplating solution temperature of 67° C., a cathode current density of 1.5 A/dm$^2$, and an electroplating time of 60 min. A coating with a thickness of 15 μm was obtained, where the weight ratio of each element in the coating was about Ni:W:C=58.6:35:6.4.

(5) In-situ synthesis of Ni—W—WC composite coating: The coating obtained in step (4) was heated to 800° C. at a ramping rate of 5° C./min and held for 2 h under an argon atmosphere, cooled down to about 200° C. with the furnace, removed from the furnace and air cooled.

Comparative Example 3 Heat Treatment at 600° C.

An in-situ method for synthesizing a Ni—W—WC composite coating is provided. The process was specifically as follows.

(1) Preparation of electroplating solution: 300 mL of deionized water was added to a cleaned 1 #beaker, and heated to 65° C.; and then an amount of solid nickel sulfate was added, and stirred until they were completely dissolved. Another 300 mL of deionized water was heated to 75° C. in a 2 #beaker, and then sodium citrate, citric acid, ammonium citrate and sodium tungstate were added sequentially, and stirred until they were completely dissolved. The liquid in the 1 #beaker was slowly added to the 2 #beaker; and then a recarburizer and a wetting agent were added, and stirred until they were completely dissolved. Finally, deionized water was added to make up the solution in the 2 #beaker to a constant volume, and the solution was adjusted to pH 7.6 with aqueous ammonia. The composition of the electroplating solution is shown in Table 2.

(2) Pretreatment of substrate: The surface (10×10 cm$^2$) of a carbon steel substrate was polished with 180 #-240 #carborundum, washed with deionized water, degreased with 350 mL of a degreasing reagent (a mixed solution containing hydrogen sodium oxide of 8 g/L, sodium silicate of 2 g/L, sodium carbonate of 1.5 g/L, and sodium citrate of 0.5 g/L) at 65° C., and washed with water, then with 10% $H_2SO_4$ for 10 min, and then with water until neutral.

(3) Low-current electrolysis: An appropriate amount of an electroplating solution having a composition as shown in Table 2 was added to an electroplating bath. Low-current electrolysis was carried out using a constant voltage DC power supply with a corrugated iron plate as the cathode and stainless steel as the anode. to allow the complexing agent and additives in the freshly prepared electroplating solution to reach an optimum state. During electrolysis, the temperature was controlled at 67° C., the current density in the cathode was 1 A/dm$^2$, and the electrolytic treatment was continued for 12 h.

(4) Preparation of Ni—W—C alloy coating by electrodeposition: The substrate obtained in step (2) was electroplated in the electroplating solution treated in step (3). The specific electroplating conditions were: an anode of an iridium-tantalum alloy, a cathode of a pretreated carbon steel substrate, an electroplating solution temperature of 67° C., a cathode current density of 3 A/dm$^2$, and an electroplating time of 50 min. A coating with a thickness of 15 μm was obtained, where the weight ratio of each element in the coating was about Ni:W:C=46.3:41.7:12.

(5) In-situ synthesis of Ni—W—WC composite coating: The coating obtained in step (4) was heated to 600° C. at a ramping rate of 5° C./min and held for 2 h under an argon atmosphere, cooled down to about 200° C. with the furnace, removed from the furnace and air cooled.

Comparative Example 4 Heat Treatment at 1000° C.

An in-situ method for synthesizing a Ni—W—WC composite coating is provided. The process was specifically as follows.

(1) Preparation of electroplating solution: 300 mL of deionized water was added to a cleaned 1 #beaker, and heated to 65° C.; and then an amount of solid nickel sulfate was added, and stirred until they were completely dissolved. Another 300 mL of deionized water was heated to 75° C. in a 2 #beaker, and then sodium citrate, citric acid, ammonium citrate and sodium tungstate were added sequentially, and stirred until they were completely dissolved. The liquid in the 1 #beaker was slowly added to the 2 #beaker; and then a recarburizer and a wetting agent were added, and stirred until they were completely dissolved. Finally, deionized water was added to make up the solution in the 2 #beaker to a constant volume, and the solution was adjusted to pH 7.6 with aqueous ammonia. The composition of the electroplating solution is shown in Table 2.

(2) Pretreatment of substrate: The surface (10×10 cm$^2$) of a carbon steel substrate was polished with 180 #-240 #carborundum, washed with deionized water, degreased with 350 mL of a degreasing reagent (a mixed solution containing hydrogen sodium oxide of 8 g/L, sodium silicate of 2 g/L, sodium carbonate of 1.5 g/L, and sodium citrate of 0.5 g/L) at 65° C., and washed with water, then with 10% $H_2SO_4$ for 10 min, and then with water until neutral.

(3) Low-current electrolysis: An appropriate amount of an electroplating solution having a composition as shown in Table 2 was added to an electroplating bath. Low-current electrolysis was carried out using a constant voltage DC power supply with a corrugated iron plate as the cathode and stainless steel as the anode. to allow the complexing agent and additives in the freshly prepared electroplating solution to reach an optimum state. During electrolysis, the temperature was controlled at 67° C., the cathode current density was 1 A/dm$^2$, and the electrolytic treatment was continued for 12 h.

(4) Preparation of Ni—W—C alloy coating by electrodeposition: The substrate obtained in step (2) was electroplated in the electroplating solution treated in step (3). The specific electroplating conditions were: an anode of an iridium-tantalum alloy, a cathode of a pretreated carbon steel substrate, an electroplating solution temperature of 67° C., a cathode current density of 3 A/dm$^2$, and an electroplating time of 50 min. A coating with a thickness of 15 μm was obtained, where the weight ratio of each element in the coating was about Ni:W:C=46.3:41.7:12.

(5) In-situ synthesis of Ni—W—WC composite coating: The coating obtained in step (4) was heated to 1000° C. at a ramping rate of 5° C./min and held for 2 h under an argon atmosphere, cooled down to about 200° C. with the furnace, removed from the furnace and air cooled.

Test Examples

The Ni—W—WC composite coatings synthesized in situ were tested and characterized as follows.

1. Coating Characterization

The coating obtained in Example 2 was characterized. The results are shown in FIGS. 1-4.

FIG. 1 shows the surface morphology and the element distribution of the coating. It can be seen that the addition of the recarburizer has no obvious influence on the surface morphology and W content in the coating. but significantly changes the C content in the coating. In a coating without the recarburizer, the W content is 40.5 wt. %, and the C content is 2.7 wt. %; while the W content is 41.7 wt. %, and the C content is 12 wt. % in a coating with the addition of the recarburizer.

Figure 2:
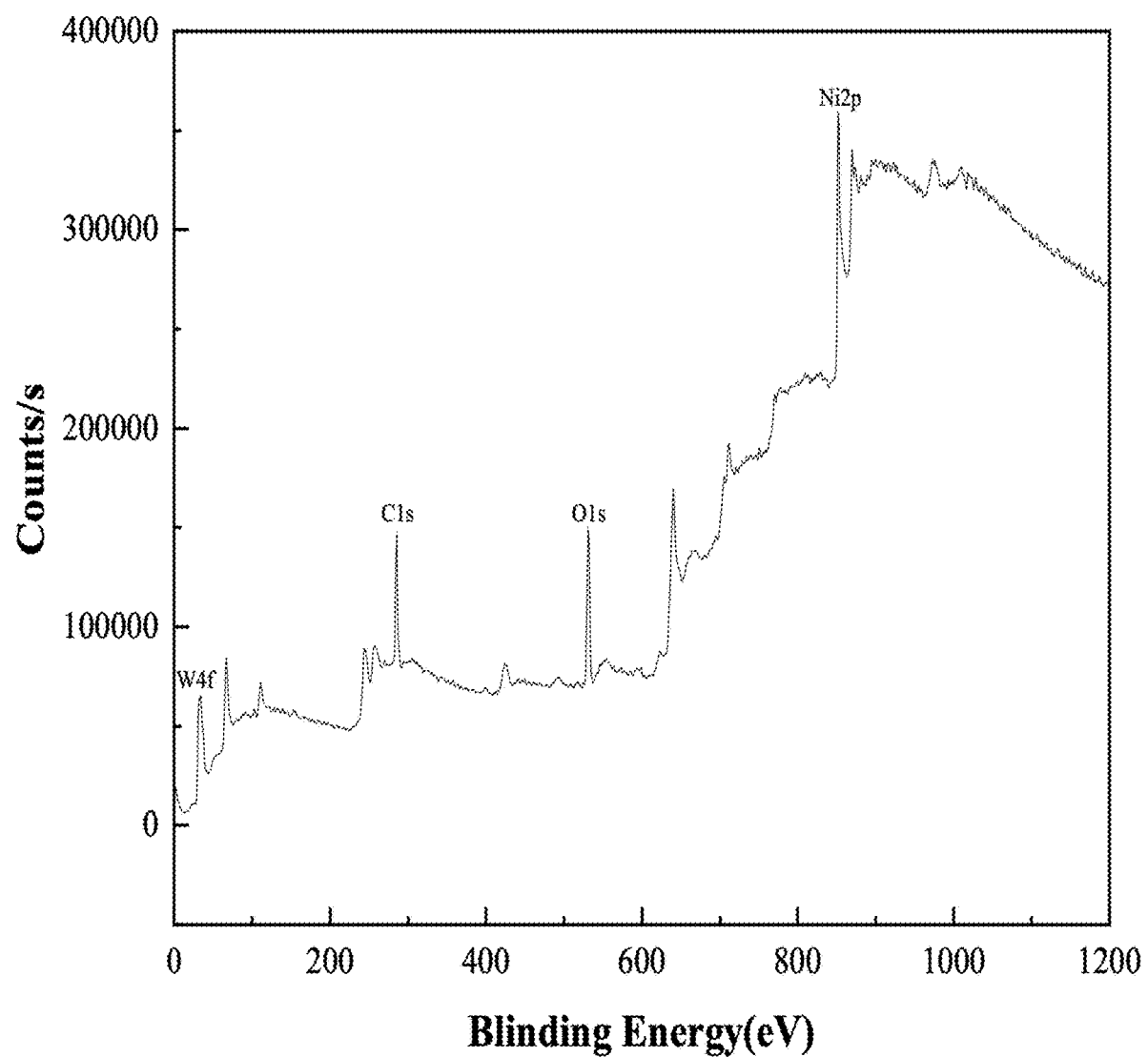
FIG. 2 shows a XPS survey spectrum of a coating obtained Example 2 of the present invention.

FIG. 2 shows that the carbon element in the obtained coating mainly exists in the form of C—C, indicating that there are a large amount of organic matters entrapped in the coating.

Figure 3:
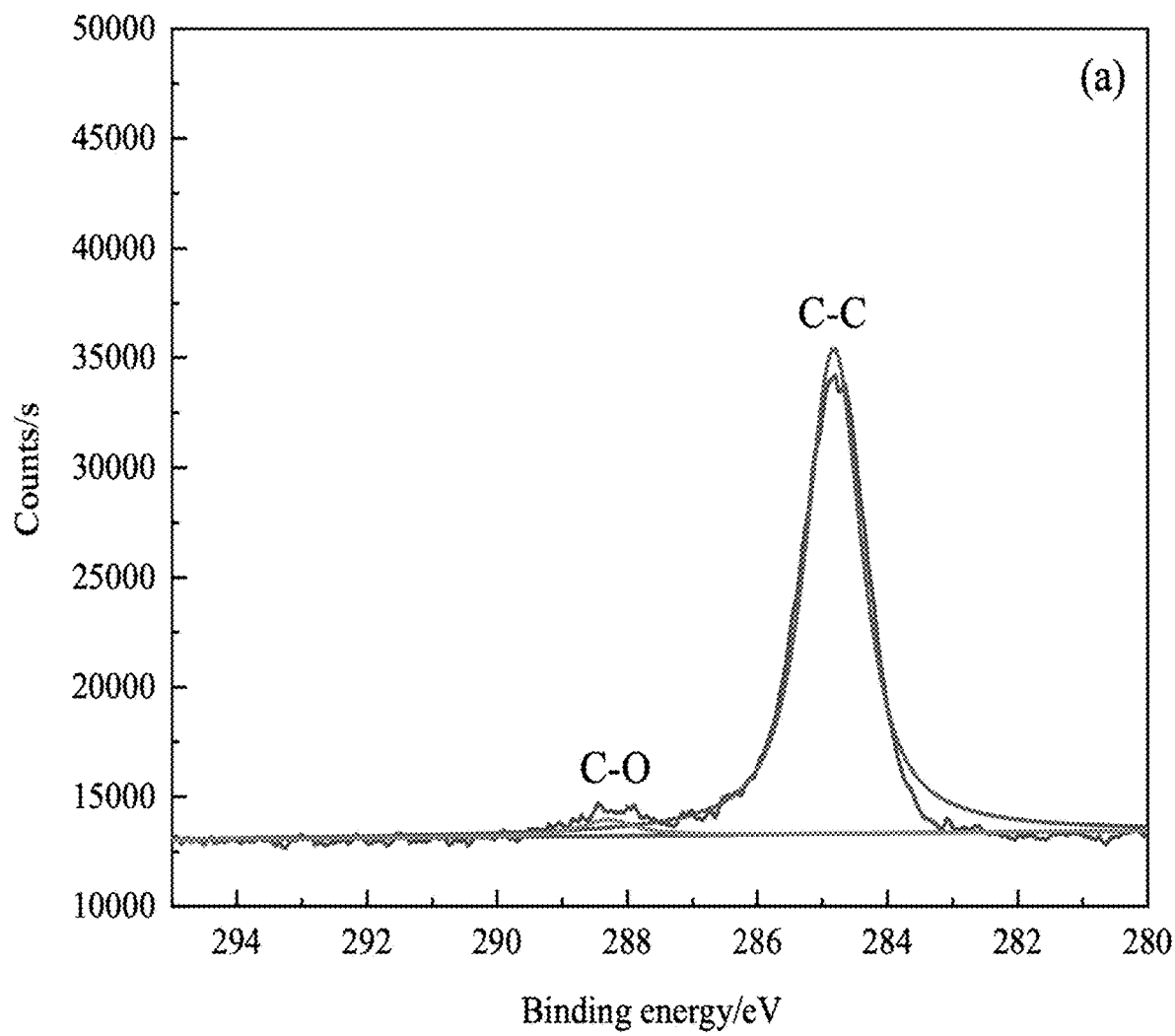
FIG. 3 shows a high-resolution analysis spectrum of C is in a coating obtained in Example 2 of the present invention.

FIG. 3 shows the surface morphology of the Ni—W—C alloy coating after heat treatment at 800° C., in which some uniformly dispersed polygonal particles are in-situ generated tungsten carbide particles.

Figure 4:
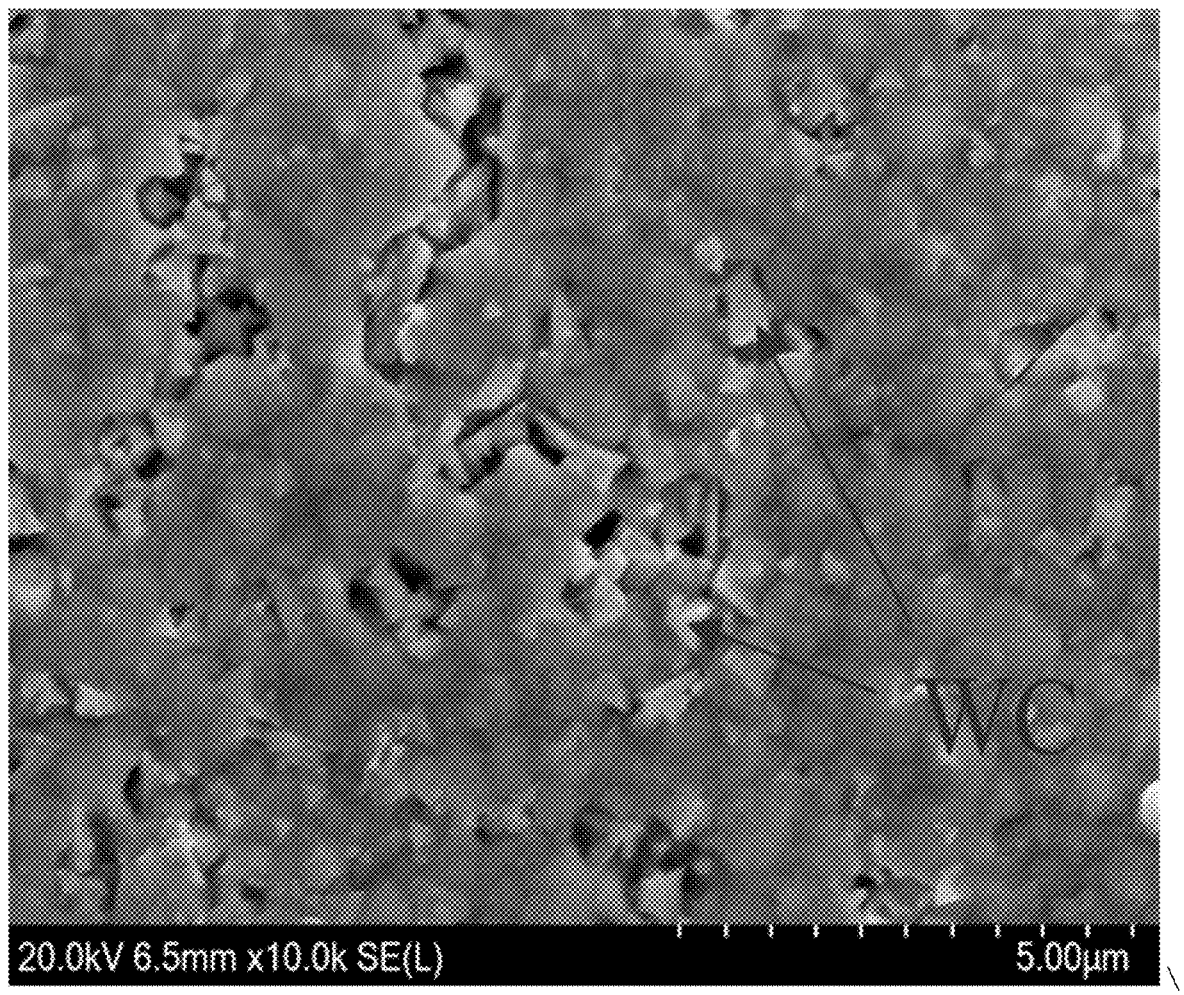
FIG. 4 is an SEM image showing the morphology of a coating after heat treatment obtained in Example 2 of the present invention.
Figure 5:
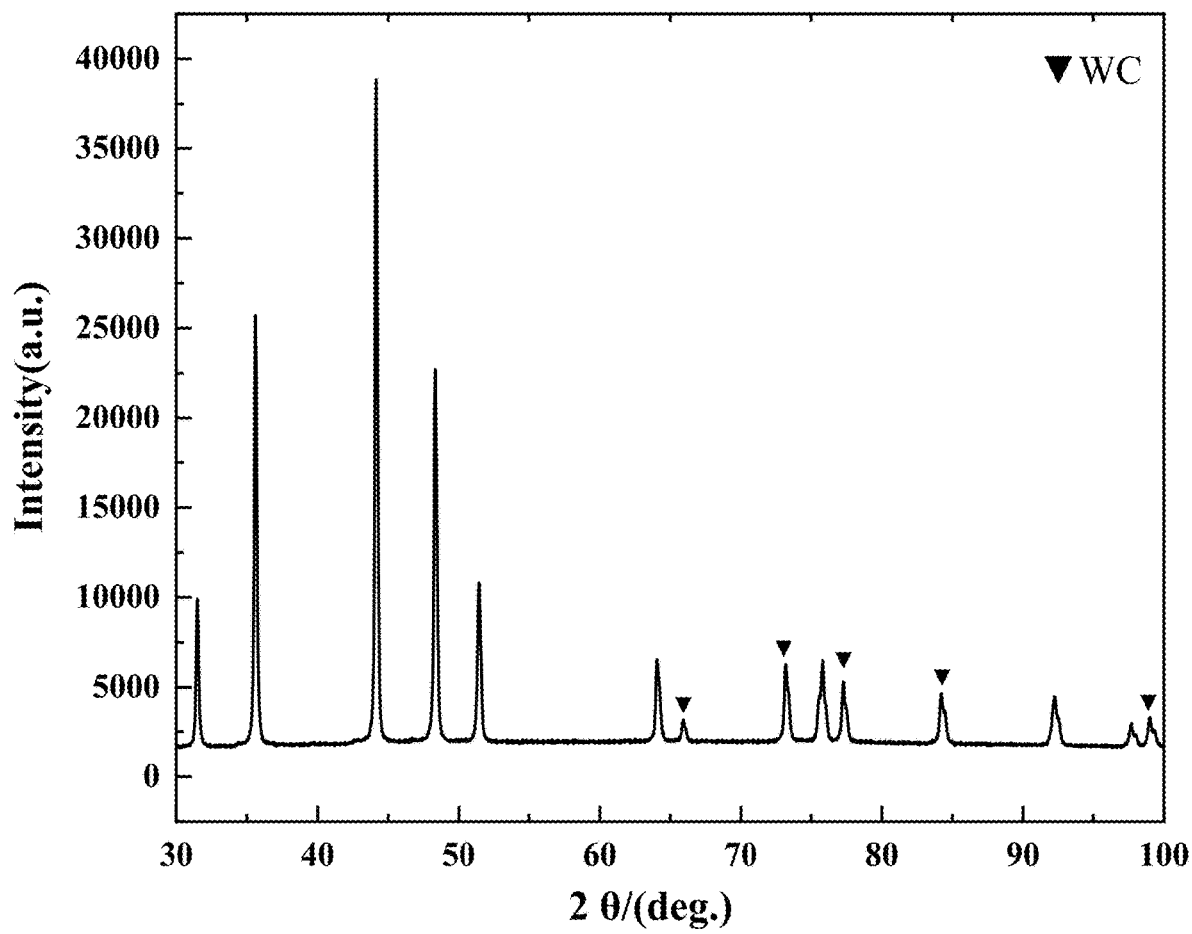
FIG. 5 shows an XRD pattern of the coating obtained after heat treatment in Example 2 of the present invention.

FIG. 4 shows the XRD analysis of the coating after heat treatment, in which peaks marked with triangle are the peaks of tungsten carbide. By analyzing the peak intensity, the content of tungsten carbide in the obtained coating is 3-7 wt. %; and the grain size of tungsten carbide calculated by Scherrer's formula is about 30-35 nm, which is consistent with the size of WC particles observed from the SEM image, suggesting that the Ni—W—WC composite coating is prepared in situ.

2. Hardness Test

The coating obtained in Examples 1-4 and Comparative Examples 1-4 was tested for hardness. The test results are shown in Table 6.

TABLE 6

| No. | recarburizer is added or not | Current density/ A · dm$^{-2}$ | Heat treatment temperature/ ° C. | Heat treatment time/h | WC/wt. % | Average hardness/ Hv | Remark |
|---|---|---|---|---|---|---|---|
| Example 1 | Yes | 2 | 700 | 3 | 3.42 | 1569 | |
| Example 2 | Yes | 3 | 800 | 2 | 5.43 | 1635 | |
| Example 3 | Yes | 4 | 900 | 2 | 4.73 | 1803 | |
| Example 4 | Yes | 5 | 900 | 2 | 6.81 | 1756 | |
| Comparative Example 1 | Not | 3 | 800 | 2 | — | 873 | |
| Comparative Example 2 | Yes | 1.5 | 800 | 2 | — | 739 | |
| Comparative Example 3 | Yes | 3 | 600 | 2 | — | 921 | |
| Comparative Example 4 | Yes | 3 | 1000 | 2 | 5.12 | — | Uneven hardness * |

* The distribution of elements in the coating after heat treatment at 1000° C. is uneven, and the hardness of each region varies greatly, suggesting that the heat treatment temperature is too high.

As can be seen from Table 6, the Ni—W—WC composite coating can be synthesized in situ by adding a recarburizer and heat treatment at a high temperature (>700° C.); and in contrast, no WC evolution is observed in the coating without the recarburizer, or with the recarburizer but deposited at low current density or with low heat treatment temperature (<600° C.), indicating that whether to add a recarburizer to the electroplating solution, as well as the current density and heat treatment temperature are essential conditions for the preparation process of synthesizing a Ni—W—WC composite coating in situ. Considering the influence of the electrodeposition conditions and the heat treatment temperature on the final performances, and for the sake of reduced energy consumption, and less operation time, in a preferred preparation process for in-situ synthesis of Ni—W—WC composite coating in the present invention, the electroplating solution has a composition of $NiSO_4 \cdot 6H_2O$ 40 g/L, $Na_2WO_4 \cdot 2H_2O$ 50 g/L, $Na_3C_6H_5O_7 \cdot 2H_2O$ 45 g/L, $C_6H_8O_7$ 20 g/L, $C_6H_{17}N_3O_7$ 5 g/L, 3-pyridinesulfonic acid 6 g/L, and X-114 6 mL/L; the electrodeposition are carried out at 3 A/cm² and for 50 min; and the heat treatment temperature of the coating is 800° C., and the treatment time is 2 h.

Apparently, the above-described embodiments are merely examples provided for clarity of description, and are not intended to limit the implementations of the present invention. Other variations or changes can be made by those skilled in the art based on the above description. The embodiments are not exhaustive herein. Obvious variations or changes derived therefrom also fall within the protection scope of the present invention.

What is claimed is:

1. An in-situ method for synthesizing a Ni—W—WC composite coating, comprising steps of: immersing a substrate to be coated in an electroplating solution and electroplating, to obtain a Ni—W—C alloy coating on the surface of the substrate; and then subjecting the alloy coating to heat treatment to obtain the Ni—W—WC composite coating; wherein the electroplating solution comprises: a nickel salt, a tungstate, citric acid, a citrate, a recarburizer, and a wetting agent.

2. The in-situ synthesis method according to claim 1, wherein the nickel salt is selected from the group consisting of nickel sulfate, nickel sulfonate, nickel chloride and any combination thereof.

3. The in-situ synthesis method according to claim 1, wherein the tungstate is sodium tungstate.

4. The in-situ synthesis method according to claim 1, wherein the recarburizer is selected from the group consisting of 2-(4-pyridyl)ethanesulfonic acid, 2-pyridinesulfonic acid, 3-pyridinesulfonic acid, pyridinium propanesulfonate and any combination thereof.

5. The in-situ synthesis method according to claim 1, wherein the concentration range of each component in the electroplating solution is: nickel salt 20-70 g/L, tungstate 30-85 g/L, citric acid 7-35 g/L, citrate 10-70 g/L, recarburizer 1-14 g/L, and wetting agent 0.5-9.5 mL/L.

6. The in-situ synthesis method according to claim 1, wherein the electroplating solution is prepared by steps of: mixing the nickel salt, the tungstate, citric acid, and the citrate into water to form a uniform solution; adding the recarburizer, and the wetting agent to the above solution; and then adjusting the solution with a pH of 7.5-7.8 to obtain the electroplating solution.

7. The in-situ synthesis method according to claim 1, wherein during electroplating, the cathode current density is 2-5 A/dm².

8. The in-situ synthesis method according to claim 1, wherein the C content in the Ni—W—C alloy coating is 7-12 wt. %, and the W content is 35-45 wt. %.

9. The in-situ synthesis method according to claim 1, wherein a temperature for heat treatment of the Ni—W—C alloy coating is 700-1000° C.

10. The in-situ synthesis method according to claim 1, wherein the Ni—W—WC composite coating has a thickness of 10-20 μm.

* * * * *